United States Patent [19]
Onan et al.

[11] Patent Number: 5,398,758
[45] Date of Patent: * Mar. 21, 1995

[54] UTILIZING DRILLING FLUID IN WELL CEMENTING OPERATIONS

[75] Inventors: David D. Onan, Lawton; Bobby G. Brake; Dralen T. Terry, both of Duncan, all of Okla.

[73] Assignee: Halliburton Company, Duncan, Okla.

[ * ] Notice: The portion of the term of this patent subsequent to Oct. 18, 2011 has been disclaimed.

[21] Appl. No.: 159,649

[22] Filed: Nov. 30, 1993

Related U.S. Application Data

[63] Continuation-in-part of Ser. No. 146,767, Nov. 2, 1993, Pat. No. 5,355,954.

[51] Int. Cl.$^6$ ................... E21B 33/138; E21B 33/14
[52] U.S. Cl. ................... 166/292; 166/293; 175/66; 507/145
[58] Field of Search ............ 166/292, 293; 175/65, 175/66; 507/140, 145

[56] References Cited

U.S. PATENT DOCUMENTS

| | | | |
|---|---|---|---|
| Re. 32,742 | 9/1988 | Skjeldal | 106/292 X |
| 2,109,337 | 2/1938 | Mayfield . | |
| 2,646,360 | 7/1953 | Lea . | |
| 2,705,050 | 3/1955 | Davis et al. . | |
| 2,875,835 | 3/1959 | Watkins et al. . | |
| 3,168,139 | 2/1965 | Kennedy et al. . | |
| 3,180,748 | 4/1965 | Holmgren et al. . | |
| 3,499,491 | 3/1970 | Wyant et al. | 166/292 |
| 3,557,876 | 1/1971 | Tragesser | 166/292 |
| 3,618,680 | 11/1971 | Ellard | 175/17 |
| 3,701,384 | 10/1972 | Routson | 166/292 |
| 3,887,009 | 6/1975 | Miller et al. | 166/292 |
| 4,123,367 | 10/1978 | Dodd | 175/65 |
| 4,328,036 | 5/1982 | Nelson et al. | 166/293 |
| 4,384,896 | 4/1983 | Aitcin et al. . | |
| 4,385,935 | 5/1983 | Skjeldal | 106/292 X |
| 4,410,366 | 10/1983 | Birchall et al. | 106/314 |
| 4,732,213 | 3/1988 | Bennett et al. | 166/293 X |
| 4,775,505 | 10/1988 | Kuroda et al. . | |
| 4,781,760 | 11/1988 | Svensson et al. . | |
| 4,818,288 | 4/1989 | Aignesberger et al. . | |
| 4,883,125 | 11/1989 | Wilson et al. | 166/293 X |
| 4,933,013 | 6/1990 | Sakai et al. . | |
| 4,935,060 | 6/1990 | Dingsoyr | 106/292 X |
| 5,016,711 | 5/1991 | Cowan | 166/250 |
| 5,020,598 | 6/1991 | Cowan | 166/293 |
| 5,058,679 | 10/1991 | Hale et al. | 166/293 |
| 5,086,850 | 2/1992 | Harris et al. | 175/61 |
| 5,149,370 | 9/1992 | Olaussen et al. | 166/293 X |
| 5,209,297 | 5/1993 | Ott | 507/140 X |

OTHER PUBLICATIONS

*Condensed Chemical Dictionary*, p. 842, 7th Edition, 1967.

Malhotra, et al., "Silica Fume Concrete—Properties, Applications, and Limitations", *Concrete International/*-May 1983, pp. 40–46.

API Spec. 10, 3rd Addition, Jul. 3, 1986.

*Primary Examiner*—George A. Suchfield
*Attorney, Agent, or Firm*—Robert A. Kent

[57] ABSTRACT

The present invention provides methods of cementing a well with a cementing composition utilizing a portion of the fluid used to drill the well as a component of the cementing composition. The methods basically comprise forming a cementing composition, consisting essentially of a cementing precursor composition and a set-activator introducing the cementing composition into the well and permitting the cementing composition to set into a hard mass therein; wherein the cementing precursor composition is the fluid used to drill the well.

19 Claims, No Drawings

UTILIZING DRILLING FLUID IN WELL CEMENTING OPERATIONS

CROSS REFERENCE TO RELATED APPLICATION

This is a continuation-in-part of application Ser. No. 08/146,767, filed Nov. 2, 1993, now U.S. Pat. No. 5,355,954.

BACKGROUND OF THE INVENTION

1. Field of the Invention.

The present invention relates generally to well cementing operations, and more particularly, to methods of cementing a well with a cementing composition which includes, as a component thereof, a portion of the fluid used to drill the well.

2. Description of the Prior Art.

A variety of fluids are used in drilling wellbores. Generally, drilling fluids are solids-containing water based gels or hydrocarbon based fluids which can be non-weighted or weighted with particulate weighting material such as barite. When a wellbore is being drilled the drilling fluid is circulated through the wellbore; after a wellbore is drilled, the circulation of the drilling fluid is stopped, the well is logged and a string of pipe is run in the wellbore. After the pipe is run, the drilling fluid in the wellbore is cleaned up, also referred to as "conditioned," by circulating drilling fluid downwardly through the interior of the pipe and upwardly through the annulus between the exterior of the pipe and the walls of the wellbore while removing drilling solids and gas therefrom. Primary cementing operations are then performed in the wellbore, i.e., the string of pipe disposed in the wellbore is cemented therein by placing a cementing composition in the annulus between the pipe and the walls of the wellbore. The cementing composition sets into a hard substantially impermeable mass whereby the pipe is bonded to the walls of the wellbore and the annulus is sealed. When the cementing composition is run down the pipe and into the annulus, the drilling fluid in the pipe and annulus is displaced therefrom. The displaced drilling fluid which has been viewed in the prior art as a waste material is generally accumulated in a pit or tank and then discarded.

Drilling fluid often must be treated as a fluid which is hazardous to the environment, therefor the disposal of drilling fluid, particularly from offshore drilling locations, is time consuming and expensive. Thus, any environmentally acceptable use to which all, or part, of the drilling fluid could be employed at a well site, to thereby eliminate the need for disposing of the drilling fluid, would be highly advantageous.

By the present invention, methods of cementing wells with cementing compositions containing drilling fluid are provided. That is, all, or at least a portion, of the fluid used to drill a well is utilized as a component in the cementing composition used for cementing the well. Any portion of the drilling fluid which is not utilized in the cementing composition can be stored for future use as a drilling fluid, or used as a portion of a cementing composition, or disposed of conventionally, or formed, by the method of this invention, into a hard mass for disposal or storage.

SUMMARY OF THE INVENTION

The present invention provides methods of cementing a well with a cementing composition which employs all, or at least a portion, of the fluid used to drill the well as a component of the cementing composition. The methods basically comprise the steps of forming a cementing precursor composition consisting essentially of soluble silicates or stable water dispersions of a silica selected from the group consisting of colloidal silica, silica sols, silica gels and precipitated silicas; drilling a wellbore using the cementing precursor composition as the drilling fluid; combining at least a portion of the drilling fluid with a set activator to thereby form the cementing composition; placing the thus formed cementing composition in at least one location in the wellbore and permitting the cementing composition to set into a hard mass.

The cementing precursor composition preferably also includes a dispersing agent to aid in the dispersal of solids and maintaining them in suspension and a set delaying additive for increasing the time in which the cementing composition, when once formed, will set.

The set-activator employed is preferably selected from the group consisting of alkaline earth metal hydroxides, such as, calcium hydroxide and barium hydroxide and alkaline earth metal oxides, such as, magnesium oxide and strontium oxide and mixtures thereof.

The drilling fluid, i.e., the cementing precursor composition, and the set-activator are present in the cementing composition in the amount of 100 percent by weight of the cementing composition.

The quantity of set-activator employed in the cement composition is based on the weight of precursor composition employed therein. Accordingly, the set-activator is present in the cement composition in an amount in the range of from about 5 to about 30 percent by weight of cementing precursor composition.

The precursor composition, itself, preferably contains in the range of from about 40 to about 80 percent by weight of water, from about 10 to about 50 percent by weight of silica, or soluble silicates, from about 0.1 to about 5 percent by weight of dispersant and from about 0.5 to about 5 percent by weight of a set delaying additive, which is also called a retarder.

The combination of the cementing precursor composition and the set-activator, in the amounts disclosed form masses which are hard, solid and stable.

In forming the cementing composition described above, the cementing precursor composition, i.e., the drilling fluid, can be mixed with the set-activator component as the drilling fluid is circulated in the wellbore to thereby convert the drilling fluid into the cementing composition which is then placed in the zone in the well to be cemented, e.g., the annulus. As the cementing composition is placed in the zone to be cemented, drilling fluid is displaced from the wellbore. The displaced drilling fluid can be transported to a location of use or disposal and there combined with the set-activator and allowed to set into an environmentally safe cementitious mass. The displaced drilling fluid also can be stored for further use as either a drilling fluid or for conversion to a cementing composition as above described.

It is, therefore, a general object of the present invention to provide methods of utilizing drilling fluid in well cementing operations.

Other and further objects, features and advantages of the present invention will be readily apparent to those skilled in the art upon a reading of the description of preferred embodiments which follows.

DESCRIPTION OF PREFERRED EMBODIMENTS

Wellbores are commonly drilled using a rotary bit connected to a string of drill pipe. The drill pipe and bit are rotated and a drilling fluid, generally a water based gel or a hydrocarbon based fluid, with or without weighting material suspended therein, is circulated downwardly through the drill pipe, through ports in the drill bit and then upwardly through the annulus between the drill pipe and the walls of the wellbore to the surface. An example of a water based gel is a viscous, aqueous suspension of a clay, such as bentonite, containing particulate weighting material, such as barite.

The drilling fluid transports cuttings produced by the drill bit to the surface where the cuttings and any entrained gas are separated from the drilling fluid; the thus cleaned, i.e., "conditioned," drilling fluid is then placed in a reservoir on the surface from which it is pumped by circulating pumps back into the drill string. When the desired depth of the wellbore is attained, drilling and circulation of drilling fluid are stopped, the drill pipe and bit are removed from the wellbore, subterranean formations penetrated by the wellbore are usually logged and pipe to be cemented in the wellbore is placed therein.

After the pipe to be cemented has been placed in the wellbore, a primary cementing operation is performed whereby the drilling fluid in the wellbore is displaced from the wellbore by a cement slurry and one or more liquid spacers which are pumped downwardly through the pipe and then upwardly into the annulus between the pipe and the walls of the wellbore. The cement slurry hardens into a substantially impermeable solid mass in the annulus. The hard cement bonds the pipe to the walls of the wellbore and seals the annulus whereby formation fluids are prevented from flowing from subterranean zones penetrated by the wellbore into the annulus and/or to the surface.

As mentioned above, conventional drilling fluid which is displaced from the wellbore during primary cementing often must be treated as a fluid which is hazardous to the environment. Therefor, disposal of drilling fluid is time consuming and expensive, particularly at offshore drilling locations where the displaced drilling fluid must be placed in a tanker, transported to shore, unloaded and disposed of on shore in an environmentally safe manner.

The present invention provides methods of cementing a well using a cementing composition which contains, as a component thereof, all, or at least a portion, of the fluid used to drill the well. The methods basically comprise the steps of forming a cementing composition which includes drilling fluid, introducing the cementing composition into the well to be cemented and permitting the cementing composition to set therein into a hard cementitious mass having compressive strength.

The cementing composition of this invention consists essentially of a first component and a second component wherein the first component is selected from the group consisting essentially of stable water dispersions of silica or solutions of hydrated and anhydrous soluble silicates. The silica in the stable water dispersions is selected from the group consisting of colloidal silica, silica sols, silica gels, and precipitated silicas. The second component is comprised of a set activator selected from the group consisting of alkaline earth metal oxides and hydroxides.

The first component, which was referred to previously as a cementing precursor composition, in addition to silica, or soluble silicates, also contains water, a dispersant and a set retarder in the amounts previously recited. The first component, without more, does not possess hydraulic activity, that is, it will not set into a hard mass having compressive strength. The first component is used as the drilling fluid in this invention. Accordingly, the first component can be prepared and used as a drilling fluid and/or stored for an indefinite period of time until a composition is required which does possess hydraulic activity at which time the first and second components are combined.

The combination of the first and second components, in the amounts previously recited, will cause the hydration reaction to begin. The time required to attain final set is dependent upon the quantity of set retarder added to the first component.

In summary, the method of this invention comprises drilling a wellbore with the cementing precursor composition as a drilling fluid, converting the drilling fluid into a cementitious composition, whereby it will subsequently set into a hard cementitious mass by combining it with a set activator and placing the thus formed cementing composition into at least one location and permitting it to set therein into an environmentally safe cementitious mass. The cementing composition has excellent flow and solids suspension properties, thixotropy, little or no soluble free lime, anti-strength retrogression, corrosion resistance and low fluid loss properties.

As earlier mentioned, the first component of the cementing composition of this invention is a cementing precursor composition consisting essentially of a stable water dispersion of a silica selected from the above named sources or soluble silicates. Stable dispersions of silica sols contain silica particles with diameters of 3–100 nanometers (nm), specific surface areas of 50–300 meters squared per gram ($m^2/g$), and silica contents in the range of 15 to 50 weight percent. The stability of a silica sol is dependent on several factors. The pH must be above 7 to maintain the negative charges on the silica particles in order to prevent aggregation of the particles. This charge separates the particles by electrostatic repulsion. Aggregation is also prevented at neutral or lower pH by an adsorbed layer of inert material on silica surfaces. Aggregation, as well as particle growth, is minimized by maintaining a low silica concentration, low temperature, and a pH of 9–10.

Silica gels are three-dimensional networks of aggregated spherical silica particles which have colloidal dimensions; the gel pores are filled with the medium, usually water, in which the gel is prepared. The silica particles may range in mass from polysilicic acid units (molecular weight $\sim$280) containing only a few silicon atoms to colloidal $SiO_2$ particles containing thousands of silicon atoms. The particles which link together to form the networks may vary from 100 to 1000 $m^2/g$.

Precipitated silicas (also called particulate silica) are powders obtained by coagulation of fine silica particles from an aqueous solution under the influence of high salt concentrations or other coagulants. Fine silica can be made by reacting certain types of silicate minerals with acids, whereby silica dissolves which is subsequently precipitated. Another method involves the reaction of sodium silicate with an ammonium salt, such as ammonium chloride. Silica can also be obtained as a precipitate by reacting sodium silicate with a sodium salt such as sodium sulfate, and then acidizing the product. A number of processes involve the precipitation of silica in the presence of fluoride ions. Examples include passing silicon tetrafluoride vapors into hot sodium carbonate solution; reaction of sodium silicate with ammonium fluoride in ammonium hydroxide solution; heating silica or silicates with ammonium fluoride to form vapors, containing silicon diaminotetrafluoride, followed by hydrolysis. A large number of processes involve the precipitation or silica from solutions of alkali metal silicate with acid. The surface area of the silica obtained by precipitation from solution rages from 45-700 m$^2$/g. The average particle size ranges from 10-25 nm.

There are three common crystalline forms of silicon dioxide: quartz, which is thermodynamically stable below 870° C.; tridymite, which is stable from 870° to 1470° C.; and cristobalite, which is stable above 1470° C. Quartz has the highest density, 2.655. Cristobalite has a density ranging from about 2.2 to about 2.32. The density of supercooled silicon dioxide glass or vitreous silica is about 2.2. Quartz is not soluble in water under autogenous pressure below 150° C., but increases linearly with temperature. Up to approximately 150° C., quartz is slightly soluble to the extent of 0.0006 percent, while the solubility of pulverized quartz (4 microns in diameter) is approximately 0.003 percent below 150° C. The solubility of silica gel, at 94° C., is about 0.04 percent, and increases rapidly as the pH is increased above about 8 or 9.

Silica can exist in water solution as monosilicic acid, $Si(OH)_4$, or, if the pH is high enough, as silicate ions. The solubility of quartz at room temperature has been reported to be in the range of about 6-11 ppm (as $SiO_2$). The solubility of vitreous silica at room temperature is in the range of about 80-130 ppm (as $SiO_2$). Solubility increases with increases in temperature and pH and markedly increases above pH 9. The maximum solubility of quartz under pressure in $H_2O$ occurs at 330° C., at which temperature the saturated solution contains 0.07 weight percent silica.

Dissolved silica polymerizes to form discrete particles which associate to give chains and networks. The three stages of reaction are: polymerization of monomers to form particles, growth of particles and linking of the particles to form chains and then networks. In basic solution, the particles grow in size and decrease in number. In acid solution, or in the presence of flocculating salts, particles aggregate into three dimensional networks and form gels.

Commercial soluble silicates have the general formula of $M_2O \cdot mSiO_2 \cdot nH_2O$, where M is an alkali metal and m and n are the number of moles of $SiO_2$ and $H_2O$, respectively. Sodium silicates are the most common. Soluble silicates, due to their alkaline nature, react with acid compounds to form gels, or sols if relatively solute concentrations of dissolved silica are acidified. The reaction of soluble silicates with salts of heavy metals generally results in a complex mixture of the metal silicate, metal hydroxide, and silica gel.

A dispersing agent is combined with the water to facilitate the dispersal of the silica particles in the water and to maintain the particles in suspension therein. While various dispersing agents can be used, a particularly suitable dispersing agent is comprised of the condensation polymer product of an aliphatic ketone, an aliphatic aldehyde and a compound which introduces acid groups into the condensation polymer. Such a dispersing agent is disclosed in U.S. Pat. No. 4,818,288 issued Apr. 4, 1989 to Aignesberger et al.

The most preferred dispersing agent of the type described above for use in accordance with this invention is comprised of the condensation polymer product of acetone, formaldehyde and sodium sulfite. The dispersing agent is generally included in the cementing precursor composition in an amount in the range of from about 0.1% to about 5% by weight of precursor composition. Generally, the above described dispersing agent is commercially available in an aqueous solution containing the dispersing agent in an amount in the range of from about 30% to about 35% by weight of the solution.

The set delaying additive, for increasing the time in which the cementitious composition of this invention sets, can be any of various set delaying additives heretofore utilized in cement compositions, e.g., a copolymer of 2-acrylamido-2-methyl propane sulfonic acid and acrylic acid, tartaric acid or calcium or ammonium lignosulfonate salts. Preferably, the set delaying additive is, present in the cementing precursor composition in an amount in the range of from about 0.5% to about 5% by weight of the composition. A preferred set delaying additive is a lignosulfonate salt such as calcium lignosulfonate which can be obtained commercially in an aqueous solution containing the lignosulfonate salt in an amount in the range of from about 40% to about 60% by weight of the solution.

The set-activator is generally present in the cementing composition of this invention in an amount in the range of from about 5% to about 30% by weight of the cementing precursor composition.

The drilling fluid component of the cementing composition of this invention, as previously stated, is the cementing precursor composition.

If desired, the cementing precursor composition can be formed by mixing the various ingredients thereof at a location remote from the well site, or the ingredients can be mixed at the well site just prior to use. The drilling fluid can then be added to the set-activator to thus form the cementing composition.

In cementing operations carried out at offshore well locations, the cementing precursor composition is preferably formed on land and then mixed with the set activator at the job site. When the location of the well site is on land, it is generally most convenient and economical to mix the ingredients of the cementing precursor composition at the well site and then to mix it with the set-activator just prior to introducing the resulting cementing composition into the wellbore. When the cementing precursor composition is formed at the well site, it can be stored until use, or the various ingredients of the cementing precursor composition, can be mixed on-the-fly. The set-activator can also be mixed with the cementing precursor composition on-the-fly as the resulting cementing composition is pumped into the wellbore penetrating the zone to be cemented. The term "on-the-fly", is used herein to mean that the ingredients of the cementing composition are mixed as they are being pumped and as the resulting cementing composition is pumped into a wellbore and subterranean zone to be cemented.

As indicated above, the methods of the present invention are particularly suitable for performing primary cementing in a wellbore. However, the methods can be utilized for performing other cementing procedures in the wellbore such as cementing zones of lost circulation in a wellbore.

In performing the methods of this invention, the cementing composition can be made by forming the above mentioned cementing precursor composition by mixing the water, silica, dispersing agent and set delaying additive ingredients of the composition and then mixing it, upon completion of drilling, with the set-activator and then pumping the thus formed cementing composition into the zone in the well to be cemented, e.g., the annulus. As the cementing composition thus formed is placed in the zone to be cemented, the drilling fluid is displaced from the wellbore.

The displaced drilling fluid can be transported to a location of use, storage or disposal, or it can be combined with the set-activator, placed and permitted to set into a cementitious mass.

As mentioned above, the cementing precursor composition can be formed at a location remote from the job site, it can be formed and stored at the job site or it can be formed on-the-fly at the job site. The used drilling fluid can be combined on-the-fly with the set-activator upon completion of drilling. The resulting cementing composition is placed in the subterranean zone to be cemented and permitted to set therein.

In order to further illustrate the methods of this invention, the following examples are given.

EXAMPLE

Cementitious compositions of this invention were prepared and tested for 24 hour compressive strength at 170° F. The results are provided in the table below.

| Compressive Strength Development of Various Silicate Cements | | | | | | | |
|---|---|---|---|---|---|---|---|
| (g) Silicate | (g) "SSA-1"[4] quartz | (g) "SSA-2"[5] quartz | (g) ZnO | (g) Na$^+$OOCCF$_3$ | (g) Na$_2$SiF$_6$ | (g) H$_2$O | 24 Hr C.S. @ 170° F. psi |
| 80 A[1] | 200 | 200 | 28 | — | 22 | 100 | 2315 |
| 80 A[1] | 200 | 200 | 28 | 22 | 22 | 100 | 2850 |
| 80 B[2] | 200 | 200 | 28 | — | 22 | 100 | 2520 |
| 80 B[2] | 200 | 200 | 28 | 22 | 22 | 100 | 2970 |
| 80 C[3] | 200 | 200 | 28 | — | 22 | 100 | 360 |
| 80 C[3] | 200 | 200 | 28 | 22 | 22 | 100 | 1020 |

| Compressive Strength Development of Various Coloidal Silica Cements | | | | | |
|---|---|---|---|---|---|
| (g) Silica | Aqueous 50% NaOH (cc) | (g) SSA-1[4] | (g) SSA-2[5] | (g) ZnO | 24 Hr C.S. @ 150° F. psi |
| 400 Class C fly ash | 200 | — | — | 25 | 345 |
| 600 Class C fly ash | 200 | — | — | 25 | 1180 |
| 400 Class F fly ash | 200 | — | — | 25 | 520 |
| 600 Class F fly ash | 200 | — | — | 25 | 3670 |
| 600 15% active silica sol | — | 100 | — | 25 | 395 |

Note:
[1] "A" is 19.2% Na$_2$O, 6.18% SiO$_2$, 18.5% H$_2$O
[2] "B" is 23.3% Na$_2$O, 75% SiO$_2$
[3] "C" is 1.62 wt parts SiO$_2$/1 wt part K$_2$O
[4] "SSA-1" is 200 mesh quartz
[5] "SSA-2" is 100 mesh quartz From the above examples it can be seen that the cementitious compositions of this invention have good compressive strengths and are suitable for use in well cementing operations.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a well utilizing a cementing composition which includes a portion of the drilling fluid used to drill the well as a component of the cementing composition, said method being comprised of the steps of:
    forming a drilling fluid consisting of a cementing precursor composition,
    drilling at least a portion of said well with said drilling fluid,
    forming said cementing composition by mixing at least a portion of said drilling fluid with a set activator,
    placing said cementing composition in the zone of said well to be cemented and,
    permitting said cementing composition to set into a hard mass in said zone;
wherein said cementing precursor composition consists essentially of soluble silicates or stable water dispersions of a silica selected from the group consisting of colloidal silica, silica sols, silica gels and precipitated silicas,
said cementing precursor composition and said set activator are present in said cementing composition in an amount of 100 percent by weight of said cementing composition wherein said set activator is present in said cementing composition in an amount in the range of from about 5 percent to about 30 percent by weight of said cementing precursor composition.

2. The method of claim 1 wherein said cementing precursor composition also contains in the range of from about to about 80 percent by weight water, from about 20 to about 50 percent by weight of said silica or soluble silicates, from about 0.1 to about 5 percent by weight of dispersant and from about 0.5 to about 5 percent by weight of set delaying additive.

3. The method of claim 2 wherein said dispersing agent is comprised of the condensation polymer product of acetone, formaldehyde and sodium sulfite.

4. The method of claim 3 wherein said set delaying agent is comprised of a lignosulfonate salt.

5. The method of claim 4 wherein said set-activator is calcium hydroxide.

6. A method of cementing a subterranean zone penetrated by a wellbore said method being comprised of the steps of:

drilling at least a portion of a wellbore with a drilling fluid, forming a pumpable cementing composition consisting essentially of at least a portion of said drilling fluid and a set activator;

pumping said cementing composition into said zone by way of said wellbore; and allowing said cementing composition to set in said zone;

wherein said drilling fluid consists essentially of soluble silicates or stable water dispersions of a silica selected from the group consisting of colloidal silica, silica sols, silica gels and precipitated silicas present in said drilling fluid in an amount in the range of from about 10 to about 50 percent by weight of said drilling fluid, water present in said drilling fluid in an amount in the range of from about 40 to about 80 percent by weight of said drilling fluid, a dispersant present in said drilling fluid in an amount in the range of from about 0.1 to about 5 percent by weight of said drilling fluid and a set delaying additive present in said drilling fluid in an amount in the range of from about 0.5 to about 5 percent by weight of said drilling fluid.

7. The method of claim 6 wherein said drilling fluid and said set activator are present in said cementing composition in an amount of 100 percent by weight of said cementing composition wherein said set activator is present in said cementing composition in an amount in the range of from about 5 to about 30 percent by weight of said drilling fluid.

8. The method of claim 7 wherein said dispersant is comprised of the condensation polymer product of an aliphatic ketone, an aliphatic aldehyde and a compound which introduces acid groups into said condensation polymer product.

9. The method of claim 8 wherein said set activator is selected from the group consisting of alkaline earth metal hydroxides, alkaline earth metal oxides and mixtures thereof.

10. The method of claim 9 wherein said drilling fluid is formed at a location remote from said wellbore and said drilling fluid and said set activator are combined at the location of said wellbore.

11. A method of cementing a string of pipe in a wellbore said method being comprised of the steps of:

drilling at least a portion of a wellbore with a cementing precursor composition;

placing said string of pipe in said wellbore containing said cementing precursor composition;

circulating said cementing precursor composition by pumping it downwardly through the interior of said pipe and upwardly through the annulus between the exterior of said pipe and the walls of said wellbore while conditioning said cementing precursor composition by removing drilling solids and gas therefrom;

combining a portion of said conditioned cementing precursor composition with a set activator to thereby form a cementing composition;

pumping said cementing composition into said annulus by way of the interior of said pipe while displacing said conditioned cementing precursor composition from said annulus and allowing said cementing composition to set into a hard mass in said annulus; wherein said cementing precursor composition consisting essentially of soluble silicates or stable water dispersions of a silica selected from the group consisting of colloidal silica, silica sols, silica gels and precipitated silicas.

12. The method of claim 11 wherein said conditioned cementing precursor composition and said set activator are present in said cementing composition in an amount of 100 percent by weight of said cementing composition wherein said set activator is present in said cementing composition in an amount in the range of from about 5 percent to about 30 percent by weight of said conditioned precursor composition.

13. The method of claim 12 wherein said conditioned precursor composition also contains in the range of from about 40 to about 80 percent by weight water, from about 20 to about 50 percent by weight of said silica or soluble silicates, from about 0.1 to about 5 percent by weight of dispersant and from about 0.5 to about 5 percent by weight of set delaying additive.

14. The method of claim 13 wherein said dispersant is comprised of the condensation polymer product of an aliphatic ketone, an aliphatic aldehyde and a compound which introduces acid groups into said condensation polymer product.

15. The method of claim 14 wherein said set activator is selected from the group consisting of alkaline earth metal hydroxides, alkaline earth metal oxides and mixtures thereof.

16. The method of claim 15 wherein said cementing precursor composition is formed at a location remote from said wellbore and said set activator is combined with said conditioned cementing precursor composition at the location of said wellbore.

17. The method of claim 16 wherein said set-activator is calcium hydroxide.

18. The method of claim 17 wherein said dispersing agent is comprised of the condensation polymer product of acetone, formaldehyde and sodium sulfite.

19. The method of claim 18 wherein said set delaying agent is comprised of a lignosulfonate salt.

* * * * *